(12) United States Patent
Yoshida

(10) Patent No.: US 7,139,049 B2
(45) Date of Patent: Nov. 21, 2006

(54) COLOR FILTER FORMING REGION OF FIRST SIDE ENTIRELY CORRESPONDS TO COLOR FILTER NON-FORMING REGION OF SECOND SIDE, AND COLOR FILTER NON-FORMING REGION OF FIRST SIDE ENTIRELY CORRESPONDS TO COLOR FILTER FORMING REGION OF SECOND SIDE

(75) Inventor: Hisashi Yoshida, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 10/790,823

(22) Filed: Mar. 3, 2004

(65) Prior Publication Data

US 2004/0207781 A1 Oct. 21, 2004

(30) Foreign Application Priority Data

Mar. 19, 2003 (JP) .............................. 2003-075424

(51) Int. Cl.
*G02F 1/1335* (2006.01)
(52) U.S. Cl. ...................... 349/106; 349/108; 349/114; 345/88
(58) Field of Classification Search ................ 349/106, 349/108, 114; 345/88
See application file for complete search history.

(56) References Cited

U.S. PATENT DOCUMENTS 6,624,860 B1 * 9/2003 Narutaki et al. ............ 349/106

2003/0020852 A1 * 1/2003 Chang et al. ............... 349/110
2004/0021807 A1 2/2004 Narutaki et al.
2006/0103794 A1 * 5/2006 Iijima et al. ................ 349/114

FOREIGN PATENT DOCUMENTS

JP 10-288706 4/1997

* cited by examiner

*Primary Examiner*—David Nelms
*Assistant Examiner*—(Nancy) Thanh-Nhan P Nguyen
(74) *Attorney, Agent, or Firm*—Reed Smith LLP; Stanley P. Fisher, Esq.; Juan Carlos A. Marquez, Esq.

(57) ABSTRACT

The present invention provides a liquid crystal display device which exhibits improved color reproducibility, high definition and a high numerical aperture by minimizing a change of a total area of color filter non-forming regions even when a position of a color filter is displaced. A color filter forming region and the color filter non-forming regions are formed within a lighting region which is visible to a viewer in the inside of one pixel. Further, in the inside of one pixel, a first side of the lighting region includes both of the color filter forming region and the color filter non-forming region, a second side of the lighting region which faces the first side in an opposed manner includes both of the color filter forming region and the color filter non-forming region, the first side assumes the color filter non-forming region at a region which faces the color filter forming region of the second side in an opposed manner, and the second side assumes the color filter non-forming region at a region which faces the color filter forming region of the first side in an opposed manner.

22 Claims, 10 Drawing Sheets

Prior Art

Prior Art

COLOR FILTER FORMING REGION OF FIRST SIDE ENTIRELY CORRESPONDS TO COLOR FILTER NON-FORMING REGION OF SECOND SIDE, AND COLOR FILTER NON-FORMING REGION OF FIRST SIDE ENTIRELY CORRESPONDS TO COLOR FILTER FORMING REGION OF SECOND SIDE

BACKGROUND OF THE INVENTION

The present invention relates to a liquid crystal display device, and more particularly to a liquid crystal display device which includes a color filter forming region and color filter non-forming regions in the inside of a lighting region which is visible to a viewer within one pixel.

Since a liquid crystal display device is thin, light-weighted and exhibits the low power consumption, the liquid crystal display device is used as a display device of electronic equipments in a broad range covering a notebook type personal computer, a word processor, an electronic notebook, a mobile phone, a camera built-in video recorder and the like. Different from a cathode ray tube or a plasma display device, the liquid crystal display device is not self-luminous and displays an image or the like by controlling a light quantity of light incident from the outside. Further, by providing a plurality of color filters as light control elements to the liquid crystal display device, the liquid crystal display device can perform a color image display of multi-colors. A most popularly used liquid crystal display device is a so-called transmissive type liquid crystal display device which arranges an illumination source which is referred to as a backlight using a fluorescent tube, a light emitting diode or the like on a back surface thereof and displays images by controlling a quantity of light which passes through the liquid crystal display device out of light emitted from the backlight.

However, in this transmissive type liquid crystal display device, the power consumption attributed to the backlight occupies an approximately half of the total power consumption and hence, when the portable type electronic equipment is driven by a battery, this power consumption attributed to the backlight is a major factor which shortens the use time of the liquid crystal display device. Further, when the transmissive type liquid crystal display device is used in a bright environment such as the outdoors, an ambient light reflects on a surface of a display region and hence, it is difficult to recognize a display image.

As a liquid crystal display device which is always used in a portable manner in a bright environment such as the outdoors, there has been known a so-called reflective type liquid crystal display device which does not usually use a backlight, includes a reflection film and controls a reflection light of an ambient light from surroundings of the liquid crystal display device using a liquid crystal layer. Further, there has been also known a semi-transmissive and semi-reflective type (hereinafter also referred to as "partial transmissive type") liquid crystal display device which performs a transmissive type display and a reflective type display using semi-transmissive and semi-reflective films. Still further, there has been also known a liquid crystal display device which forms openings in color filters for enhancing the brightness.

FIG. 9 is a schematic view for explaining the constitution of a vicinity of one pixel of a conventional liquid crystal display device, wherein FIG. 9(a) is a plan view, FIG. 9(b) is a cross-sectional view taken along a line A–A' in FIG. 9(a), and FIG. 9(c) is a cross-sectional view taken along a line B–B' in FIG. 9(a). The liquid crystal display device includes a large number of pixels which are arranged in a matrix array and also includes color filters of plural colors on either one of a pair of substrates. A liquid crystal layer (not shown in the drawing) is inserted into a gap defined between the pair of substrates which are laminated to each other. FIG. 9 shows only one substrate SUB1 on which the color filters are formed, wherein a light shielding film (a black matrix) BM, color filters CF and an overcoat layer OC are formed in this order.

Further, inside the light shielding film (so-called the black matrix) BM which is provided for enhancing the contrast of the pixel, a lighting region BA which is visible to a viewer is formed in one pixel. Then, in the inside of the lighting region BA, a color filter forming region CFA and opening portions of the color filter CF which constitutes a color filter non-forming regions CFN are formed.

Here, in the description of this specification, "lighting region which is visible to a viewer in one pixel" indicates a portion which substantially contributes to a display as viewed from the viewer within the pixel region. For example, when the pixel region is covered with a light shielding film as viewed from the viewer, an opening region of the light shielding film corresponds to the lighting region. When the light shielding film is not provided, a region where a pixel electrode is formed corresponds to the lighting region. However, in case of a lateral electric field method (an IPS method), the lighting region not only includes a region where the pixel electrode is formed but also portions in which liquid crystal is driven by a lateral electric field around the region and contribute to a display. With respect to a reflective-type liquid crystal display device, a partial transmissive type liquid crystal display device or the like in which a light shielding film is covered with reflective electrodes or the like, regions inside regions where the reflective electrodes are present correspond to the lighting regions. Here, in case of the partial transmissive type liquid crystal display device, transmissive regions which constitute opening portions of the reflective electrodes are also included in the lighting region.

As another conventional techniques which provide color filter forming regions and color filter non-forming regions, there has been known the technique in which the color filters are formed on only one sides of opening portions a light shielding portion of a reflective type liquid crystal display device (Japanese Unexamined Patent Publication Hei10 (1998)-288706 (patent literature 1)) and the technique in which color filter non-forming regions are formed in consideration of the misalignment (the positional displacement) of one substrate having color filters and another substrate in the reflective type or the partial transmissive type liquid crystal display device (Japanese Unexamined Patent Publication 2000-29012 (patent literature 2)).

FIG. 10 is a schematic plan view for explaining the pixel structure of a conventional reflective type liquid crystal display device which is disclosed in the patent literature 1. As shown in FIG. 10, in this reflective type liquid crystal display device, the color filters CF are formed only at one sides of the opening portions (corresponding to lighting regions BA) of the light shielding film BM and each lighting region BA (opening portion) is divided into a color filter forming region CFA and a color filter non-forming region CFN. This structure brings about an advantageous effect that the brightness is enhanced due to the provision of the color filter non-forming regions CFN.

Further, the patent literature 1 also discloses the liquid crystal display device in which, by taking the positional displacement of the color filters CF into consideration, the color filters CF are formed such that the color filters CF cover both ends, that is, left and right ends (in the drawing) of the respective lighting regions BA so that color filter openings which constitute color filter non-forming regions CFN are formed at the center or the like of the lighting regions BA. This structure is substantially equal to the structure shown in FIG. 9 in the technical concept.

FIG. 11 is a schematic plan view for explaining another pixel structure of the conventional liquid crystal display device which is disclosed in the patent literature 2. In the reflective type or partially transmissive type liquid crystal display device shown in FIG. 11, the misalignment of the color filter CF is taken into consideration at the time of providing the color filter non-forming regions CFN in the inside of one pixel. The color filter CF having a narrower width than the lighting region BA is formed at the center thus forming the color filter forming region CFA at the center of the lighting region BA and forming the color filter non-forming regions CFN at both ends, that is, at left and right ends. In this case, even when the misalignment of the color filter CF occurs, the total area of the color filter non-forming regions CFN is fixed or constant.

FIG. 12 is a schematic plan view for explaining still another pixel structure of the conventional liquid crystal display device disclosed in the patent literature 2. In this liquid crystal display device, the color filter CF has a cruciform and the color filter non-forming regions CFN are arranged at four corners. Also in this case, even when the misalignment of the color filter CF occurs, the total area of the color filter non-forming regions CFN is fixed or constant.

BRIEF SUMMARY OF THE INVENTION

However, the conventional techniques have following drawbacks. That is, in the liquid crystal display device shown in FIG. 10, when the misalignment of the color filter CF occurs, the total area of the color filter non-forming regions CFN in the inside of one pixel is changed and hence, the desired brightness is not obtained.

In the liquid crystal display device shown in FIG. 11, even when the misalignment of the color filter CF occurs, it is possible to maintain the total area of the color filter non-forming regions CFN at the fixed value. However, the color filter non-forming regions CFN are arranged at the whole of both (left and right) ends in the drawing and hence, when the pixel is miniaturized for high definition or when opening portions are formed in the reflective electrode for providing the partial transmissive type liquid crystal display device, the reflection region is decreased. Accordingly, a rate of an area of the color filter non-forming regions CFN with respect to an area of the lighting area BA is relatively increased and hence, a display screen becomes excessively bright. Although this drawback may be solved by narrowing a width of the color filter non-forming regions CFN, there exits a limit in narrowing such a width to take the misalignment into consideration.

Further, it may be possible to suppress the excessive brightness of the screen by forming the color filter portion CF in a cruciform as shown in FIG. 12. However, there arise portions in the color filter CF which project from the lighting region BA. Neighboring color filters CF usually exhibit different colors from each other and usually are also formed separately. Since the misalignment occurs also at the time of forming the color filters CF, to ensure a margin by taking the accuracy of formation of the color filters CF into consideration, there exists a limit in narrowing a distance between the neighboring color filters CF whereby it is difficult to realize the high definition of the pixels.

Further, when the color filter non-forming regions CFN are arranged at the center of the lighting region BA as shown in FIG. 9, even when the position of the color filter CF is displaced, it is possible to maintain the total area of the color filter non-forming regions CFN at a fixed value. However, by taking the misalignment between the color filter CF and the light shielding film BM into consideration, it is necessary to widen a width between the neighboring lighting regions BA (a width of the light shielding film BM) "b" and hence, it is difficult to obtain the high numerical aperture or the high definition. In this case, the width between the neighboring lighting regions BA (the width of the light shielding film BM) "b" must be set as a width which is obtained by adding a width corresponding to a margin of misalignment between the color filter CF and the light shielding film BM to a distance "a" between the neighboring color filters CF.

Accordingly, it is an object of the present invention to provide a liquid crystal display device which can realize the high definition and the high numerical aperture by overcoming the drawbacks of the prior art, wherein the present invention can minimize the change or the fluctuation of the total area of color filter non-forming regions in the inside of a lighting area even when the position of color filters is displaced and can narrow a distance between neighboring lighting regions (for example, a narrow-width light shielding film being sufficiently used even when the light shielding film is formed between pixels) without excessively increasing the size of the color filter non-forming regions in the inside of the lighting region.

To overcome the drawbacks, according to the liquid crystal display device, a novel shape of the color filters is devised. Typical constitutional examples of the present invention are enumerated hereinafter.

(1) In a liquid crystal display device which includes a pair of substrates, a liquid crystal layer which is sandwiched between the pair of substrates, a large number of pixels which are arranged in a matrix array and color filters, a color filter forming region and a color filter non-forming region are formed within a lighting region which is visible to a viewer in the inside of one pixel, and, in the inside of the one pixel, a first side of the lighting region includes both of the color filter forming region and the color filter non-forming region, a second side of the lighting region which faces the first side in an opposed manner includes both of the color filter forming region and the color filter non-forming region, the first side assumes the color filter non-forming region at a region which faces the color filter forming region of the second side in an opposed manner, and the second side assumes the color filter non-forming region at a region which faces the color filter forming region of the first side in an opposed manner.

(2) In the constitution (1), the color filter has shapes which intersect the first side and the second side obliquely at portions where the color filter forming region and the color filter non-forming region are changed over.

(3) In the constitution (1) or (2), in the inside of one pixel, respective portions of the first side and the second side which face each other in an opposed manner include at least portions of regions which constitute the color filter non-forming regions.

(4) In any one of the constitutions (1) to (3), the lighting region is a region where the pixel electrode is formed.

(5) In any one of the constitutions (1) to (3), the lighting region is an opening region formed in a black matrix.

(6) In any one of the constitutions (1) to (3), the black matrix is formed on the substrate on which the color filters are formed.

(7) In any one of the constitutions (1) to (3), the black matrix is formed on the substrate which faces the substrate on which the color filters are formed in an opposed manner.

(8) In any one of the constitutions (1) to (3), switching elements for selecting the pixels are formed on the substrate on which the color filters are formed.

(9) In any one of the constitutions (1) to (3), switching elements for selecting the pixels are formed on the substrate which faces the substrate on which the color filters are formed in an opposed manner.

(10) In any one of the constitutions (1) to (3), on the substrate on which the color filters are formed, switching elements for selecting the pixels, pixel electrodes to which a voltage is supplied through the switching elements and a black matrix which blocks at least light passing through between neighboring pixels are formed.

(11) In any one of the constitutions (1) to (3), on the substrate which faces the substrate on which the color filters are formed in an opposed manner, switching elements for selecting the pixels, pixel electrodes to which a voltage is supplied through the switching elements and a black matrix which blocks at least light passing through between neighboring pixels are formed.

(12) In any one of the constitutions (1) to (3), a black matrix which blocks at least light passing through between the neighboring pixels is formed on the substrate on which the color filters are formed, and switching elements which select the pixels and pixel electrodes to which a voltage is supplied through the switching elements are formed on the substrate which faces the substrate on which the color filters are formed in an opposed manner.

(13) In any one of the constitutions (1) to (3), the liquid crystal display device performs a transmissive type display.

(14) In any one of the constitutions (1) to (3), the liquid crystal display device performs a reflective type display.

(15) In any one of the constitutions (1) to (3), the liquid crystal display device performs both of a transmissive type display and a reflective type display.

Further, according to another aspect of the present invention, in a liquid crystal display device which includes a pair of substrates, a liquid crystal layer which is sandwiched between the pair of substrates, a large number of pixels having pixel electrodes which are arranged in a matrix array and color filters, a color filter forming region and color filter non-forming regions are provided in the inside of one pixel, a substantially straight first side of the pixel electrode includes the color filter forming region and the color filter non-forming region, a substantially straight second side of the pixel electrode which faces the first side in an opposed manner includes the color filter forming region and the color filter non-forming region, the first side assumes the color filter non-forming region at a region thereof which faces the color filter forming region of the second side in an opposed manner, and the second side assumes the color filter non-forming region at a region thereof which faces the color filter forming region of the first side in an opposed manner.

Further, according to still another aspect of the present invention, in a liquid crystal display device which includes a pair of substrates, a liquid crystal layer which is sandwiched between the pair of substrates, a large number of pixels which are arranged in a matrix array, color filters and a black matrix, a color filter forming region and color filter non-forming regions are provided in the inside of one pixel, a first side which is a substantially straight side of an opening portion formed in the black matrix includes the color filter forming region and the color filter non-forming region, a second side which faces the first side of the opening portion of the black matrix in an opposed manner includes the color filter forming region and the color filter non-forming region, the first side assumes the color filter non-forming region at a region thereof which faces the color filter forming region of the second side in an opposed manner, and the second side assumes the color filter non-forming region at a region thereof which faces the color filter forming region of the first side in an opposed manner.

The present invention is not limited to the above enumerated constitutions and various modifications are conceivable without departing from the technical concept of the present invention.

DETAILED DESCRIPTION OF THE INVENTION

Figure 1A:
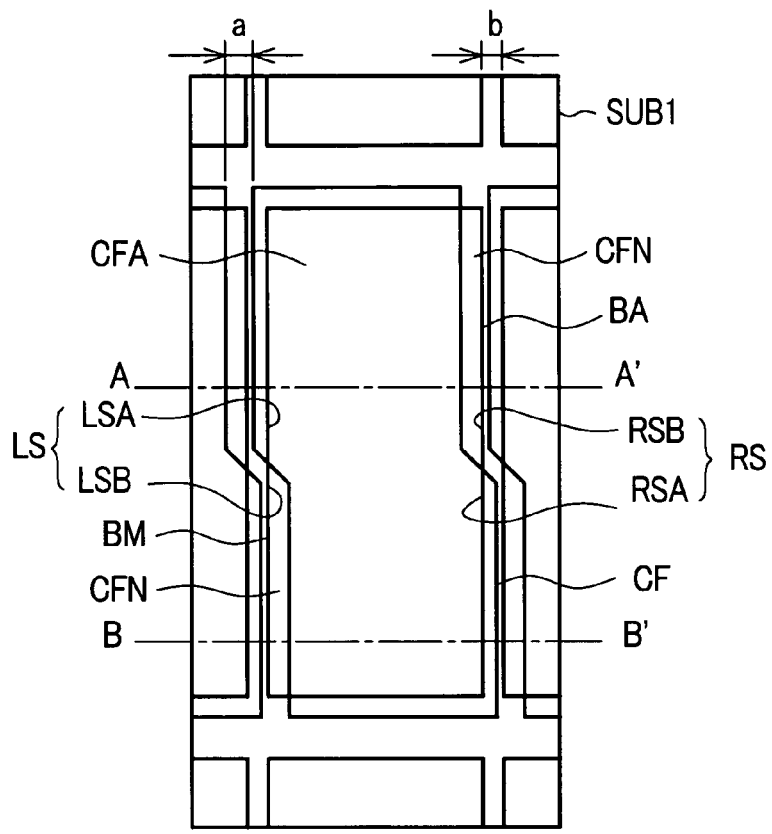
FIGS. 1A to 1C are schematic views of one substrate for explaining the constitution of the first embodiment of a liquid crystal display device according to the present invention.
Figure 1B:
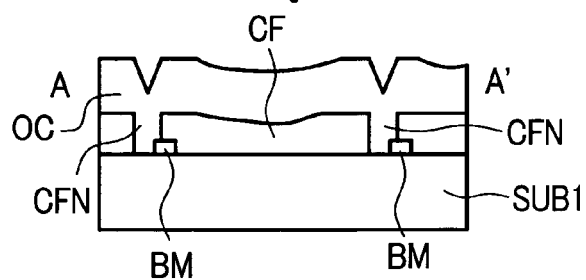
Figure 1C:
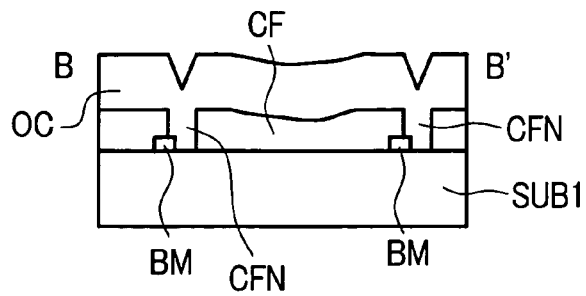

Preferred embodiments of a liquid crystal display device according to the present invention are explained in detail in conjunction with drawings which show the embodiments hereinafter. FIG. 1 is a schematic view of one substrate for explaining the constitution of the first embodiment of a liquid crystal display device according to the present invention, wherein FIG. 1(a) is a plan view of the vicinity of one pixel, FIG. 1(b) is a cross-sectional view taken along a line A–A' in FIG. 1(a) and FIG. 1(c) is a cross-sectional view taken along a line B–B' in FIG. 1(a). The liquid crystal display device is configured such that the liquid crystal display device includes a pair of substrates (one substrate and another substrate) which are preferably formed of an insulation substrate such as a glass plate and sandwiches liquid crystal between both substrates. A cell gap which is a gap defined between both substrates is regulated by spacers. Here, in FIG. 1, while only the substrate SUB1 on which color filters CF of plural colors are formed is shown, the other substrate, a liquid crystal layer sealed between both substrates, the spacers which regulate a distance between the substrates, pixel electrodes, counter electrodes and the like are omitted from the drawing.

On the substrate SUB1, a light shielding film BM, color filters CF and an overcoat layer OC are formed in this order. Inside the light shielding film (black matrix) BM which blocks at least light passing through between neighboring pixels for enhancing a contrast of the pixel, a lighting region BA which is visible to a viewer is formed in one pixel. Further, in the inside of the lighting region BA, a color filter forming region CFA and color filter non-forming regions CFN are provided. Here, light (a white-color light) which passes through the color filter non-forming regions CFN is mixed into a display light of the pixel so as to enhance the brightness.

Figure 2:
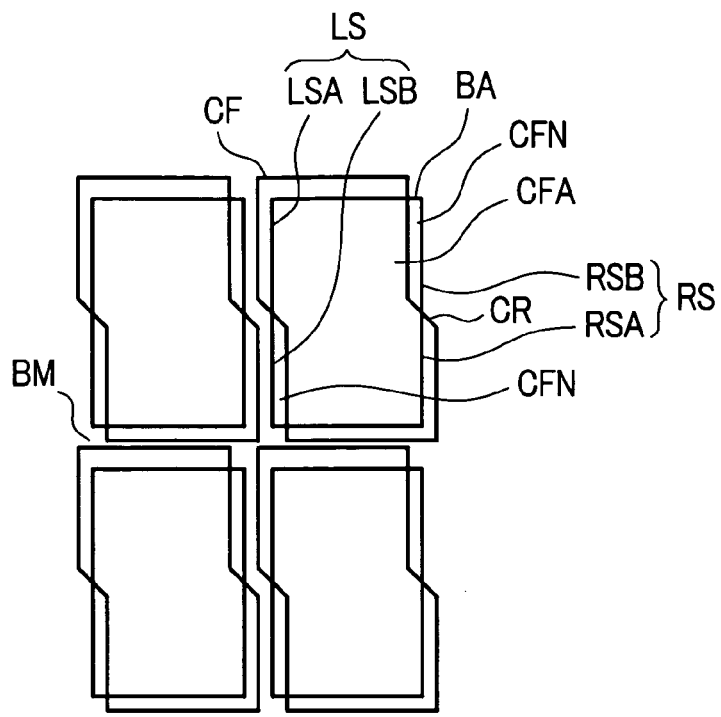
FIG. 2 is a schematic plan view for explaining, in further detail, the positional relationship between a lighting region and a color filter in the first embodiment of the present invention shown in FIG. 1 by extracting only the lighting region and the color filter from FIG. 1.

FIG. 2 is a schematic plan view for explaining, in further detail, the positional relationship between the lighting region BA and the color filter CF in the first embodiment of the present invention shown in FIG. 1 by extracting only the lighting region BA and the color filter CF from FIG. 1. Symbols which are equal to those used in FIG. 1 indicate identical parts.

Figure 11:
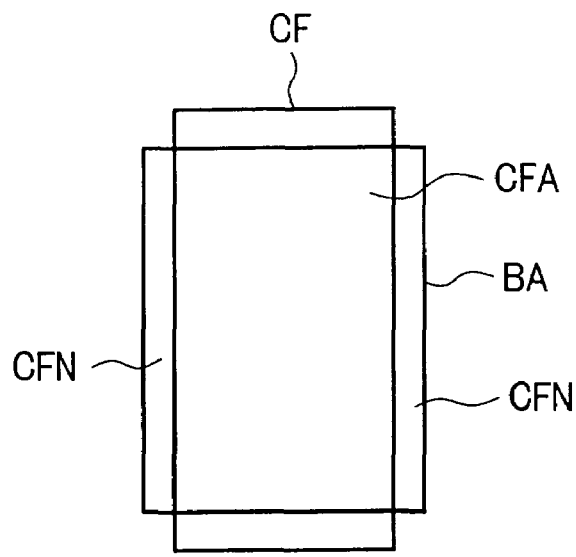
FIG. 11 is a schematic plan view for explaining another pixel structure of the conventional liquid crystal display device.
Figure 12:
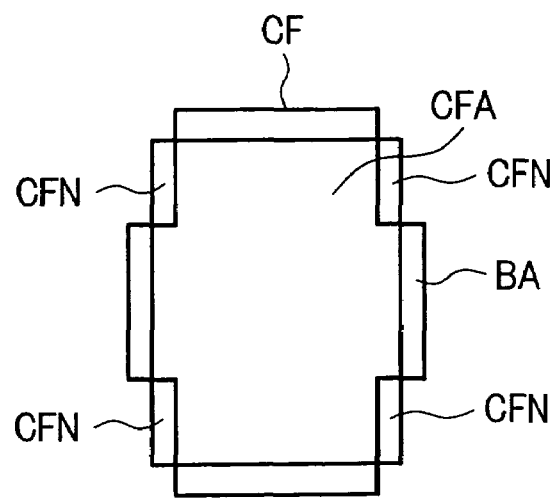
FIG. 12 is a schematic plan view for explaining still another pixel structure of the conventional liquid crystal display device.

In FIG. 1 and FIG. 2, assuming the lateral direction as the horizontal direction and the longitudinal direction as the vertical direction, in the one pixel, both of a first side LS which extends in the vertical direction of the lighting region BA and is positioned at the left side of the lighting region BA and a second side RS which faces the first side LS in the horizontal direction, extends in the vertical direction of the lighting region BA and is positioned at the right side of the lighting region BA include the color filter forming region CFA and the color filter non-forming region CFN respectively. Accordingly, compared to the prior art shown in FIG. 11, it is possible to decrease an area of the color filter non-forming regions CFN and hence, there is no possibility that the lighting region BA becomes excessively bright. Further, even when the position of the color filter CF is displaced, the change of the total area of the color filter non-forming regions CFN in the lighting region BA can be reduced to a minimum. By setting a length of the color filter non-forming region LSB of the first side LS and a length of the color filter non-forming region RSB of the second side RS substantially equal, the change of area of the color filter non-forming regions CFN attributed to the displacement of the color filter CF can be set to substantially zero.

Further, the first side LS has an upper half thereof formed of the color filter forming region LSA(CFA) and a lower half thereof formed of a color filter non-forming region LSB (CFN). On the other hand, with respect to the second side RS, the relationship between the color filter forming region CFA and the color filter non-forming region CFN is reversed compared to the first side LS. That is, the second side RS has a lower half thereof formed of the color filter forming region RSA(CFA) and an upper half thereof formed of a color filter non-forming region RSB(CFN).

What is important here is that portions of both sides LS, RS which face each other in an opposed manner do not simultaneously form the color filter forming regions CFA. On the other hand, as explained later in conjunction with FIG. 3, with respect to the first side LS and the second side RS which face each other in an opposed manner, there is no problem in making the opposing portions of both sides simultaneously form the color filter non-forming regions CFN.

In other words, the first side LS forms the color filter non-forming region CFN in the region LSB thereof which faces the color filter forming region RSA of the second side RS, while the second side RS forms the color filter non-forming region CFN in the region RSB thereof which faces the color filter forming region LSA of the first side LS. Here, the relationship between the first side LS of one pixel and the second side RS of the neighboring pixel is similar.

Due to such a constitution, the portions of both sides which face each other in an opposed manner do not form the color filter forming regions CFA and hence, a distance "a" between the neighboring color filters CF can be narrowed to a level comparable to an accuracy of the misalignment at the time of forming color filters. Further, it is possible to narrow a width between the neighboring lighting regions BA (for example, a width of the light shielding film BM) "b" independently from the distance "a" between the neighboring color filters CF. To be more specific, the width "b" is sufficient provided that a margin for misalignment between the constitutional elements which determine the lighting region BA (for example, light shielding film BM) and the color filter CF is ensured. Here, the misalignment is a misalignment which occurs at the time of forming the color filters when the constitutional element which determines the lighting region BA is formed on the substrate on which the color filters are also formed. On the other hand, the misalignment is a misalignment which is obtained by adding the misalignment at the time of laminating to the misalignment at the time of forming the color filters when the constitutional element which determines the lighting region BA and the color filters are formed on substrates which differ from each other.

For example, when the lighting region BA is determined such that the lighting region BA is defined by forming the light shielding film BM between the pixels, it is sufficient to provide the light shielding film having a narrow width.

Further, the realization of narrowing of the width "b" between the neighboring lighting regions BA leads to the realization of high definition and high numerical aperture. The width "b" may be substantially equal to or smaller than the distance "a" between the neighboring color filters CF.

Here, the color filters CF have shapes CR which respectively obliquely intersect the first side LS and the second side RS at portions where the color filter forming regions LSA, RSA and the color filter non-forming regions LSB, RSB are changed over. The portions having the shapes CR are formed in the same direction at the first side LS and the second side RS. Although the shapes CR may perpendicularly intersect the first side LS and the second side RS, it is desirable that the shapes CR intersect the first side LS and the second side RS obliquely from a viewpoint of facilitating the formation of the shapes and of efficiently ensuring a margin with the neighboring color filter CF.

Figure 3:
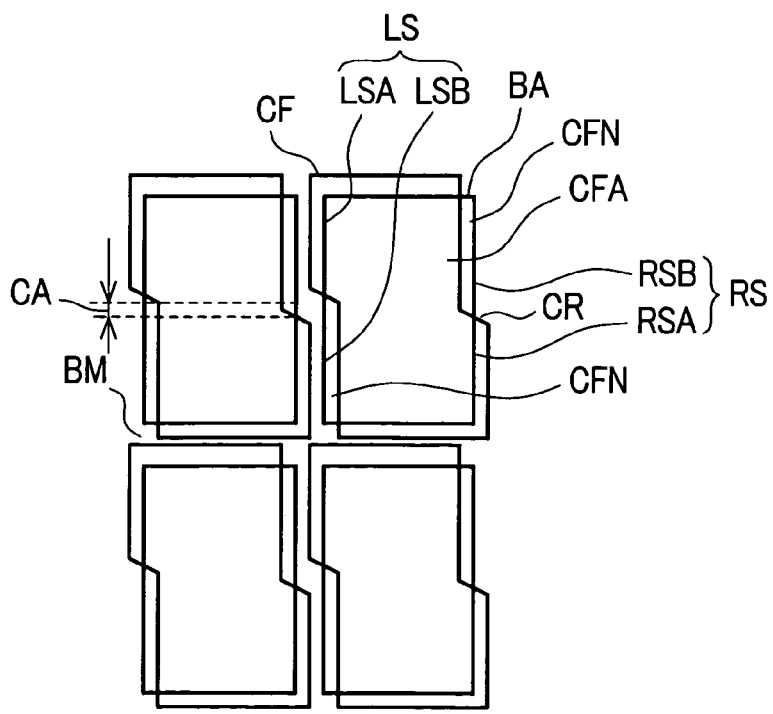
FIG. 3 is a schematic plan view similar to FIG. 2 for explaining the constitution of the second embodiment of the liquid crystal display device according to the present invention.

FIG. 3 is a schematic plan view which explains the constitution of the second embodiment of the liquid crystal display device according to the present invention and corresponds to FIG. 2. In FIG. 3, parts having the identical function as the parts shown in FIG. 1 or FIG. 2 are given the same symbols. This embodiment differs from the first embodiment with respect to a point that in the first side LS and the second side RS which face each other in an opposed manner, there exists at least a portion of a region CA where portions of both sides which face each other in an opposed manner simultaneously form the color filter non-forming region CFN. It is possible to adjust the brightness by changing a size of the region CA. Also in this embodiment, the basic constitution including a point that the portions of both sides which face each other in an opposed manner do not simultaneously form the color filter forming regions CFA and the advantageous effects obtained by the basic constitution are equal to those of the embodiment shown in FIG. 2 and hence, their repeated explanation is omitted.

Figure 4:
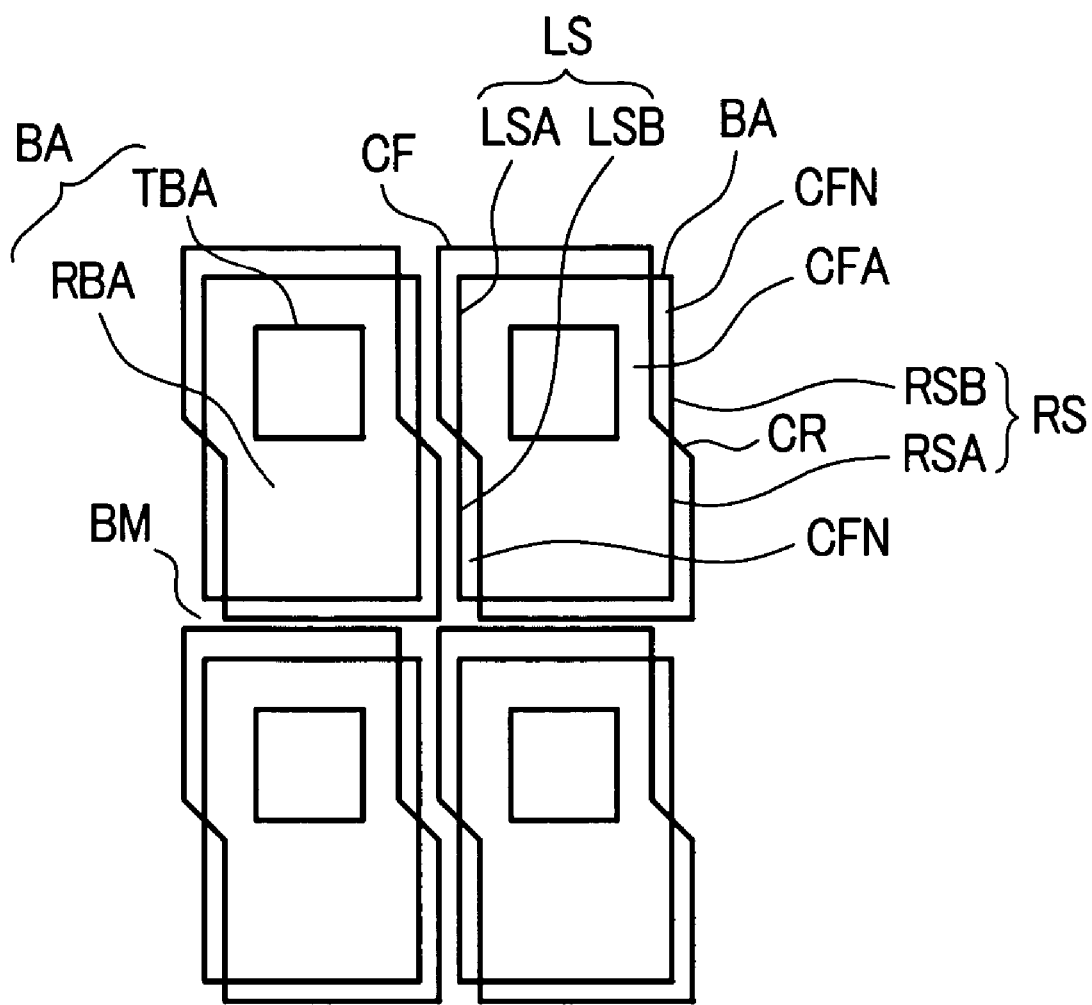
FIG. 4 is a schematic plan view similar to FIG. 2 for explaining the constitution of the third embodiment of the liquid crystal display device according to the present invention.

FIG. 4 is a schematic plan view which explains the constitution of the third embodiment of the liquid crystal display device according to the present invention and corresponds to FIG. 2. In FIG. 4, parts having the identical function as the parts shown in FIG. 1 to FIG. 3 are given the same symbols. This embodiment illustrates a case in which the present invention is applied to a partial transmissive type liquid crystal display device. A lighting region BA includes a transmissive region TBA which performs a transmissive display and a reflective region RBA which performs a reflective display. For example, the transmissive region TBA and the reflective region RBA may be realized by forming openings which allow light to pass therethrough in a portion of a reflective film (or a reflective electrode). In this embodiment, the transmissive region TBA is formed in the inside of a color filter forming region CFA. However, this embodiment is not limited to such a constitution and it may be possible to increase the brightness at the time of performing a transmissive display by forming both of the color filter forming region CFA and a color filter non-forming region CFN in the inside of the transmissive region TBA.

To consider a case in which, for example, a reflective type display is performed using a partial transmissive type liquid crystal display device such as the liquid crystal display device of this embodiment, an area of the reflective region RBA is smaller than an area of the lighting region BA and hence, a rate of change of brightness with respect to the change of the total area of the color filter non-forming region CFN in the inside of the reflective region RBA is large. Accordingly, when the whole portions of the first side LS and the second side RS of the lighting region form the color filter non-forming region CFN as in the case of the conventional example shown in FIG. 11, the display becomes excessively bright. To the contrary, in this embodiment, portions of the first side LS and the second side RS are formed of the color filter forming region CFA (LSA, RSA) and hence, there is no possibility that the display becomes excessively bright whereby the color reproducibility is enhanced. With respect to other features such as the high definition and the high numerical aperture, these features are substantially equal to those of the respective embodiments described heretofore and hence, their repeated explanation is omitted.

Figure 5A:
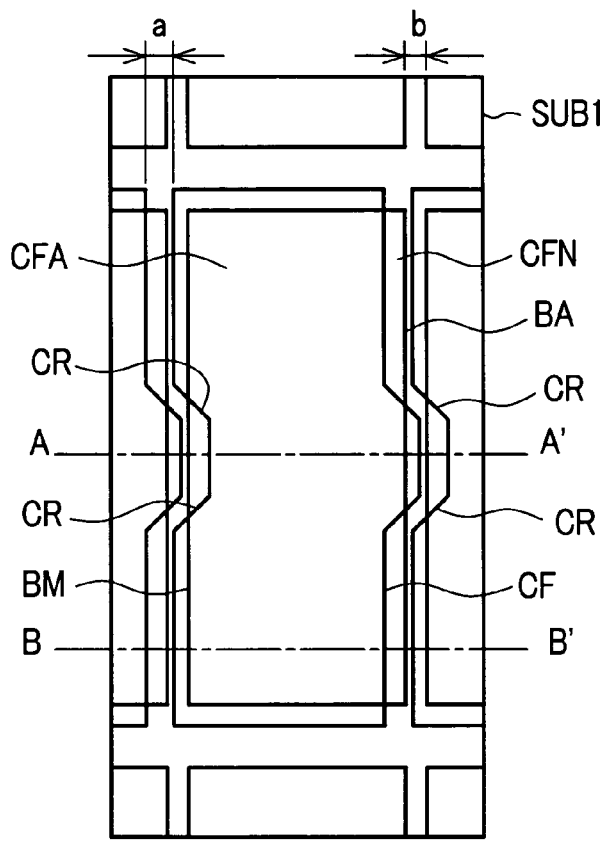
FIGS. 5A to 5C are schematic views of one substrate for explaining the constitution of the fourth embodiment of the liquid crystal display device according to the present invention.
Figure 5B:
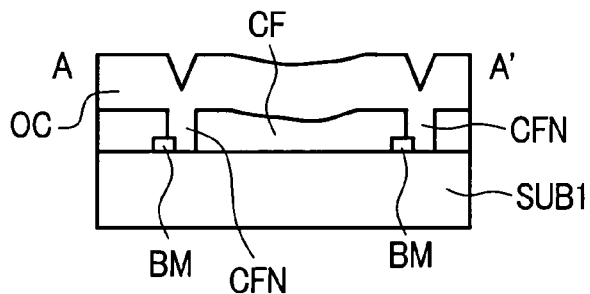
Figure 5C:
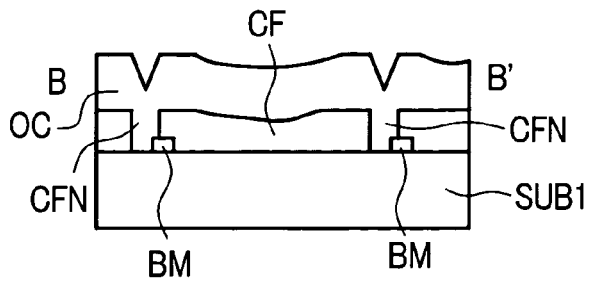

FIG. 5 is a schematic view of one substrate for explaining the constitution of the fourth embodiment of the liquid crystal display device according to the present invention, wherein FIG. 5(a) is a plan view of the vicinity of one pixel, FIG. 5(b) is a cross-sectional view taken along a line A–A' in FIG. 5(a), and FIG. 5(c) is a cross-sectional view taken along a line B–B' in FIG. 5(a). In this embodiment, shapes CR which intersect the first side LS are formed obliquely at two positions. The inclination directions of these shapes CR are opposite from each other on the same side. Two shapes CR are also formed on the second side RS. Since other constitutions and advantageous effect are substantially equal to those of the respective embodiments described heretofore, their repeated explanation is omitted.

Figure 6:
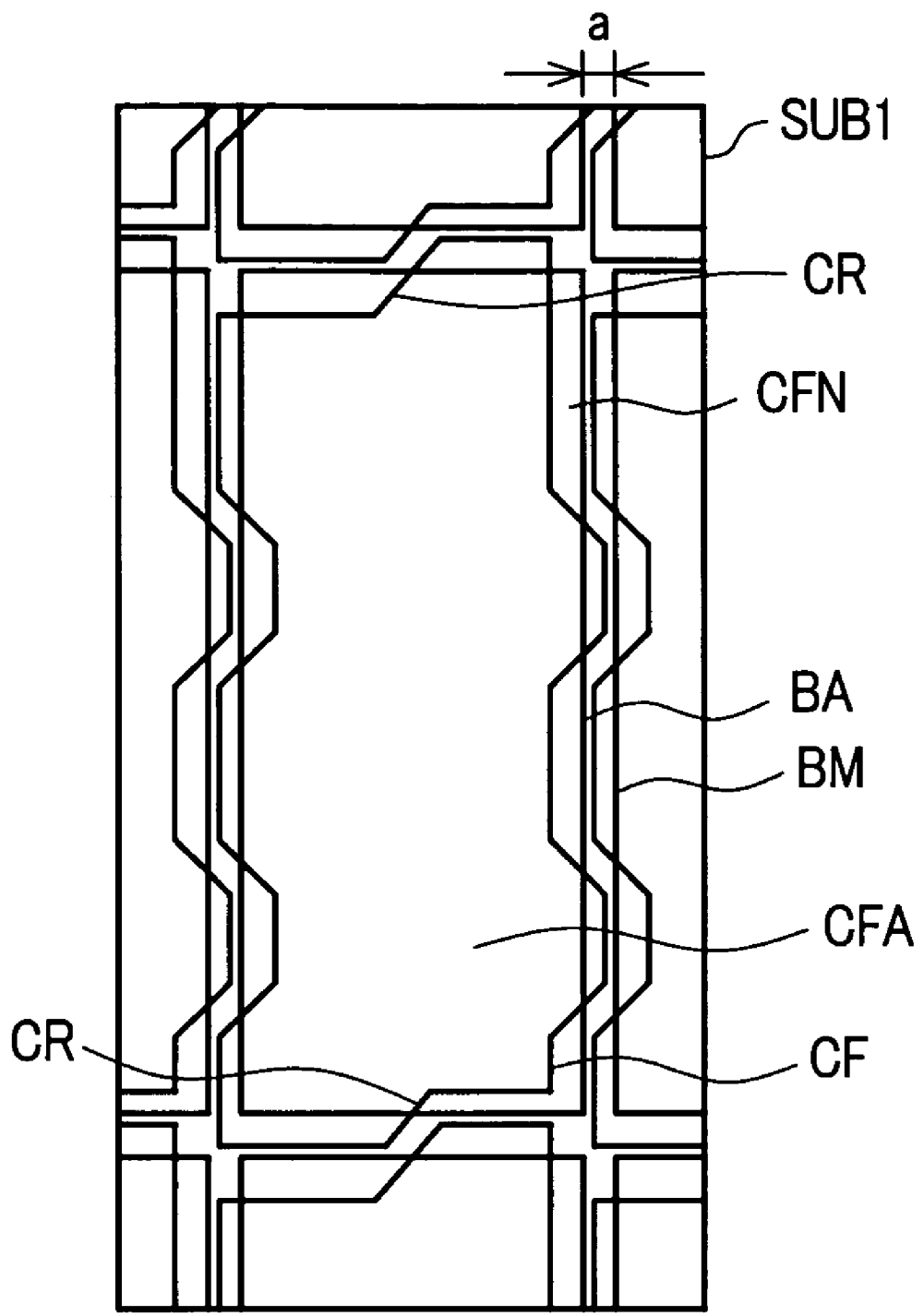
FIG. 6 is a schematic plan view for explaining the constitution of the fifth embodiment of the liquid crystal display device according to the present invention.

FIG. 6 is a schematic plan view for explaining the constitution of the fifth embodiment of the liquid crystal display device according to the present invention. As in the case of this embodiment, any arbitrary number of shapes CR may be formed for each side.

Further, in this embodiment, the constitution in respective embodiments is also applied to an upper side and a lower side which face each other in an opposed manner. Due to such a constitution, it is also possible to obtain the high definition with respect to the up-and-down direction or the vertical direction in the drawing. Since other constitutions and advantageous effect are substantially equal to those of the respective embodiments described heretofore, their repeated explanation is omitted.

Figure 7A:
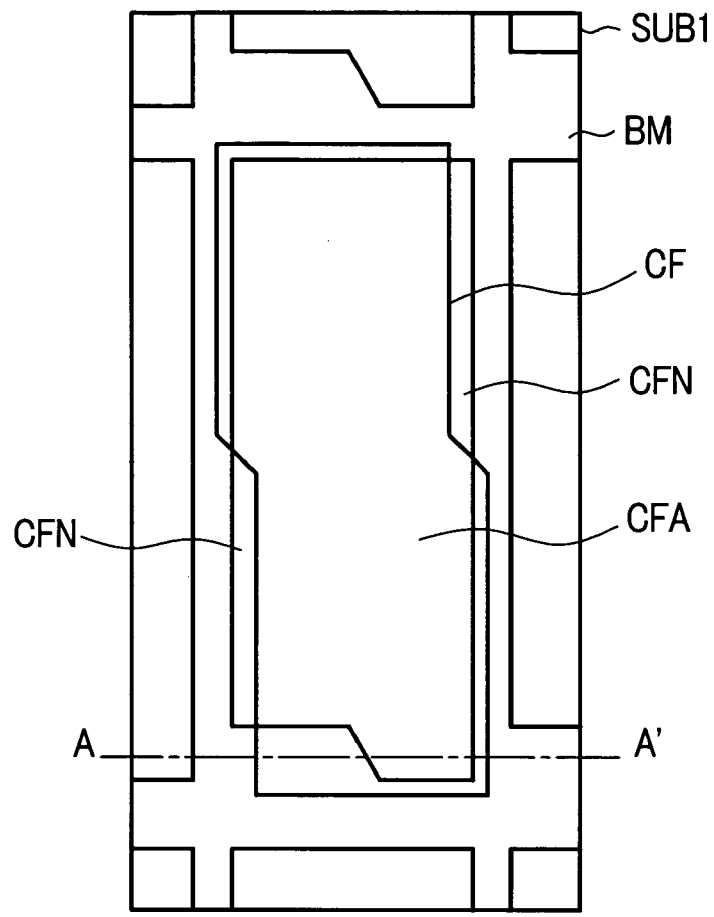
FIGS. 7A and 7B are schematic view for explaining the constitution of the sixth embodiment of the liquid crystal display device according to the present invention.
Figure 7B:
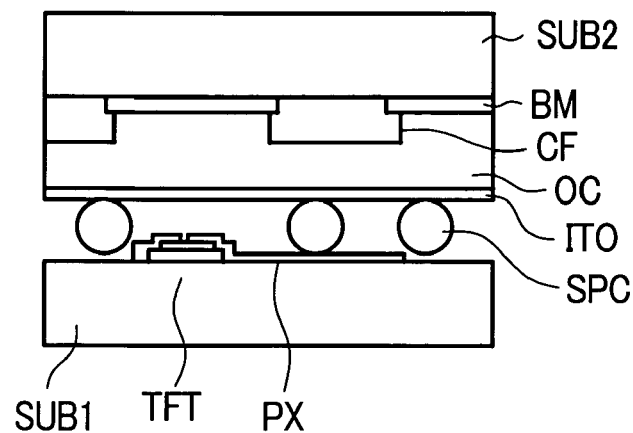

FIG. 7 is a schematic view for explaining the constitution of the sixth embodiment of the liquid crystal display device according to the present invention, wherein FIG. 7(a) is a plan view and FIG. 7(b) is a cross-sectional view taken along a line A–A' in FIG. 7(a). This embodiment illustrates the constitution of a more practical liquid crystal display device. In this embodiment, the present invention is applied to the constitution in which thin film transistors TFT are formed on a first substrate SUB1 side as switching elements and color filters CF and a light shielding film BM are formed on a second substrate SUB2 side. The thin film transistors TFT formed on the first substrate SUB1 drive pixel electrodes PX formed on the first substrate SUB1 and generates an electric field between the pixel electrodes PX and a counter electrode ITO formed on the second substrate SUB2. Here, a distance between both substrates SUB1, SUB2 is defined by the spacers SPC.

The color filters CF and the light shielding film BM are formed on the second substrate SUB2 and the constitution thereof is basically equal to the constitution of the embodiment explained in conjunction with FIG. 1 and FIG. 2 except for that symbols SUB1 and SUB2 are exchanged. Here, the light shielding film BM is formed on the second substrate SUB2 such that the light shielding film BM covers the thin film transistors TFT. Since other constitutions and advantageous effect are substantially equal to those of the respective embodiments described heretofore, their repeated explanation is omitted.

Figure 8A:
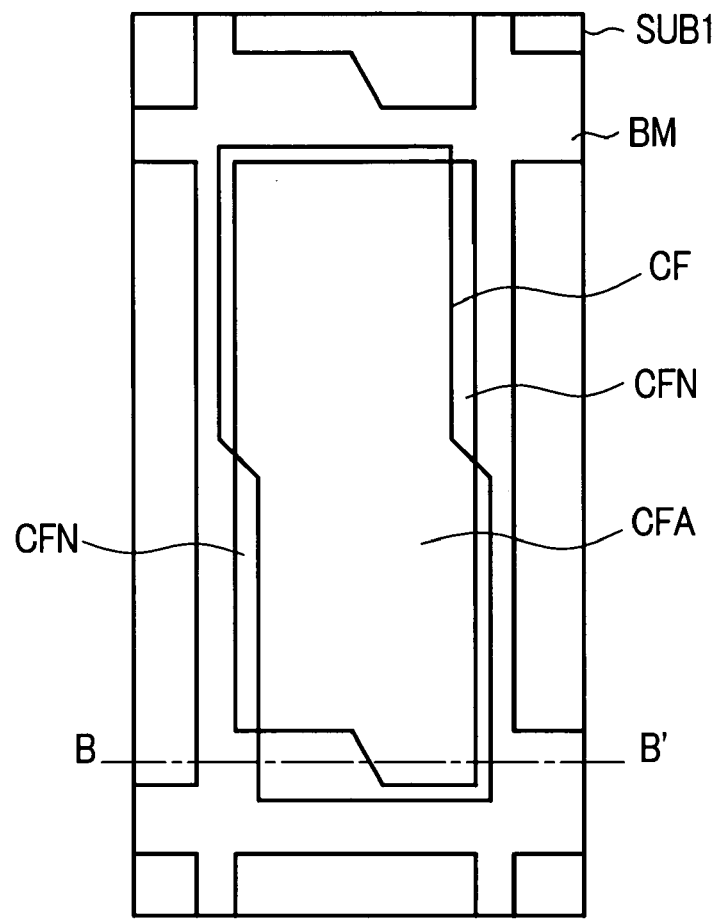
FIGS. 8A and 8B are schematic views for explaining the constitution of the seventh embodiment of the liquid crystal display device according to the present invention.
Figure 8B:
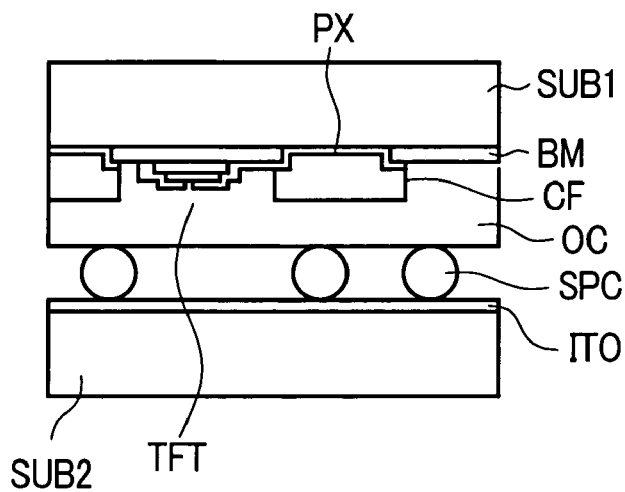
Figure 9A:
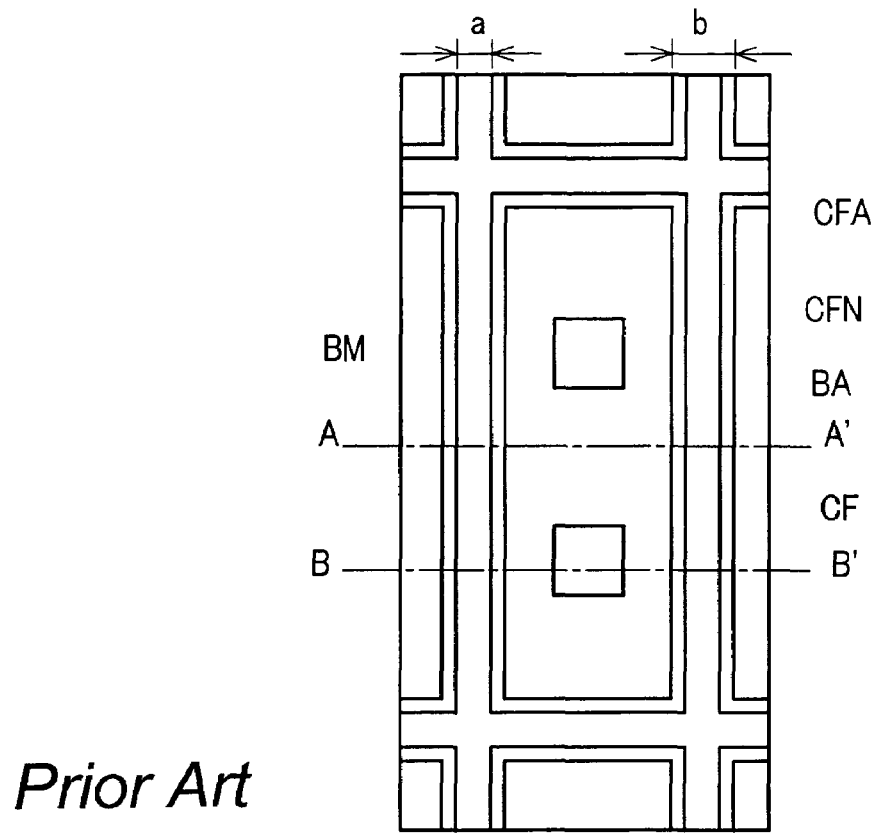
FIGS. 9A to 9C are schematic view for explaining the constitution of the vicinity of one pixel of a conventional liquid crystal display device.
Figure 9B:
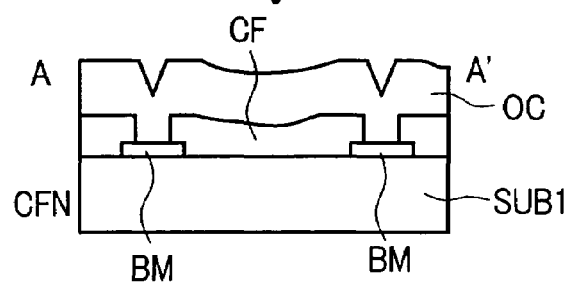
Figure 9C:
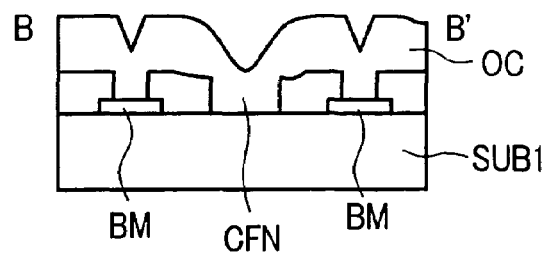
Figure 10:
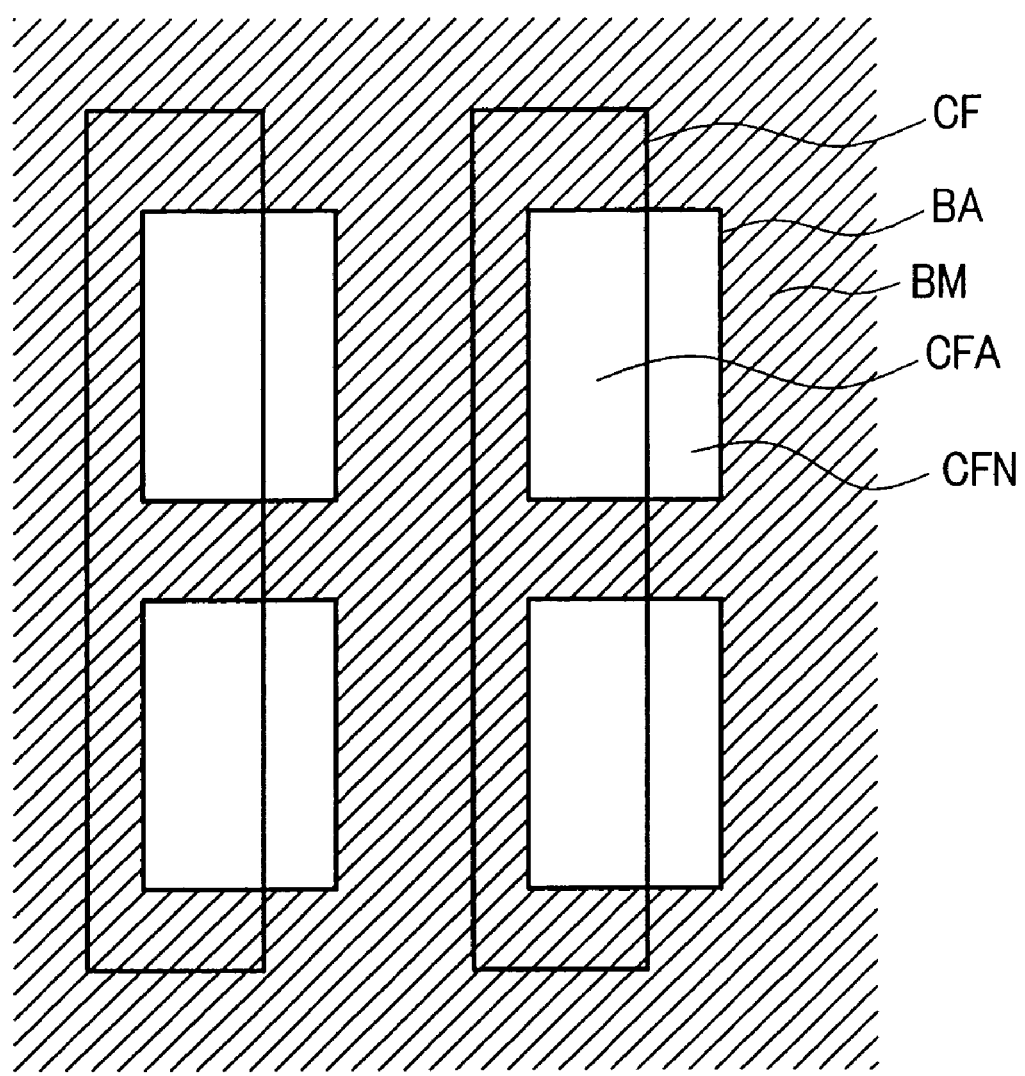
FIG. 10 is a schematic plan view for explaining the pixel structure of a conventional reflective type liquid crystal display device.

FIG. 8 is a schematic view for explaining the constitution of the seventh embodiment of the liquid crystal display device according to the present invention, wherein FIG. 8(a) is a plan view and FIG. 8(b) is a cross-sectional view taken along a line B–B' in FIG. 8(a). In this embodiment, thin film transistors TFT which constitute switching elements, color filters CF and a light shielding film BM are formed on a first substrate SUB1. A counter electrode ITO is formed on a second substrate SUB2.

The color filters CF are formed on pixel electrodes PX provided to the first substrate SUB1 and shapes of a color filter forming region CFA and color filter non-forming regions CFN are substantially equal to those in FIG. 1. Since other constitutions and advantageous effect are substantially equal to those of the respective embodiments described heretofore, their repeated explanation is omitted.

Here, the thin film transistors TFT, the pixel electrodes PX and the light shielding film BM may be formed on the first substrate SUB1 side and the color filters CF may be formed on the second substrate SUB2 side (not shown in the drawings).

Here, the present invention may include the constitution which is formed by combining the respective embodiments. Further, although the explanation is mainly made with respect to the case in which the present invention is applied to the liquid crystal display device of the vertical electric field type (TN type) heretofore, the present invention is also applicable to the liquid crystal display device of the so-called lateral electric field type (IPS type) in the same manner. In this case, the counter electrodes ITO are formed on the substrate on which the pixel electrodes PX are formed.

Further, the present invention may be applicable to a liquid crystal display device which is not provided with a light shielding film BM.

According to the present invention, when a viewer observes the screen of the liquid crystal display device, the opening regions of the light shielding film BM constitute the lighting regions BA with respect to the liquid crystal display device in which the pixel regions are covered with the light shielding film BM, while the regions on which the pixel electrodes PX are formed correspond to the lighting region BA with respect to the liquid crystal display device in which the pixel regions are not covered with the light shielding film BM. However, in the lateral electric field type (IPS type), not only the regions where the pixel electrodes PX are formed but also portions around the pixel electrode forming regions in which liquid crystal is driven by the lateral electric field and contribute to the display also constitute the lighting region BA. Further, even with respect to the reflection type liquid crystal display device, the partial transmissive type liquid crystal display device or the like in which although a light shielding film BM is provided, the light shielding film BM is concealed by pixel electrodes PX and reflective electrodes which also play a role of reflection films, the inside of regions where the reflective electrodes are formed corresponds to the lighting regions BA. Here, with respect to the partial transmissive type liquid crystal display device, transmissive regions TBA which form opening portions of reflective electrodes are also included in the lighting regions BA.

Further, it is needless to say that the liquid crystal display device according to the present invention is not limited to the liquid crystal display device in which the pixels are selected using the switching elements such as the thin film transistors TFT explained in conjunction with the respective embodiments and the present invention is applicable to a simple matrix type liquid crystal display device in the same manner. In this manner, with the provision of the liquid crystal display devices explained in conjunction with respective embodiments, it is possible to obtain the color display image with the excellent visibility.

As has been explained heretofore, according to the present invention, it is possible to minimize the change of the total area of the color filter non-forming region in the inside of the lighting region even when the position of the color filter is displaced while preventing the excessive increase of the size of the color filter non-forming regions in the inside of the lighting region and hence, the distance between the neighboring lighting regions can be narrowed (for example, the light shielding film having a narrow width being sufficient even when the light shielding film is formed between the pixels) whereby it is possible to provide the liquid crystal display device which can realize the high definition and the high numerical aperture.

What is claimed is:

1. A liquid crystal display device comprising:
    a pair of substrates;
    a liquid crystal layer which is sandwiched between said pair of substrates;
    a plurality of pixels which are arranged in a matrix array; and color filters, wherein at least one color filter forming region and at least one color filter non-forming region are formed within a lighting region in each of the pixels, said lighting region is visible to a viewer in the inside of said each pixel,
    a first side of said lighting region includes both of said color filter forming region and said color filter non-forming region,
    a second side of said lighting region which faces the first side in an opposed manner includes both of said color filter forming region and said color filter non-forming region,
    said color filter forming region of said first side entirely corresponds to said color filter non-forming region of said second side, and
    said color filter non-forming region of said first side entirely corresponds to said color filter forming region of said second side.

2. A liquid crystal display device according to claim 1, wherein in the inside of said pixel, respective portions of said first side and said second side which face each other in an opposed manner include at least portions of regions which constitute said color filter non-farming regions.

3. A liquid crystal display device according to claim 1, wherein said lighting region is a region where a pixel electrode is formed.

4. A liquid crystal display device according to claim 1, wherein said lighting region is a region where said pixel electrode is formed, said first side constitutes one side of said pixel electrode, and said second side constitutes another side of said pixel electrode which faces said one side of said pixel electrode in an opposed manner.

5. A liquid crystal display device according to claim 1, wherein said lighting region is an opening region formed in a black matrix.

6. A liquid crystal display device according to claim 1, wherein said lighting region is an opening region of said black matrix, said first side is one side of said black matrix, and said second side is another side of said black matrix which faces said one side of said black matrix in an opposed manner while sandwiching said color filter therebetween.

7. A liquid crystal display device according to claim 1, wherein said black matrix is formed on said substrate on which said color filters are formed.

8. A liquid crystal display device according to claim 1, wherein the black matrix is formed on the substrate which faces the substrate on which the color filters are formed in an opposed manner.

9. A liquid crystal display device according to claim 1, wherein switching elements for selecting the pixels are formed on said substrate on which said color filters are formed.

10. A liquid crystal display device according to claim 1, wherein switching elements for selecting said pixels are formed on said substrate which faces said substrate on which said color filters are formed in an opposed manner.

11. A liquid crystal display device according to claim 1, wherein on the substrate on which the color filters are formed, switching elements for selecting the pixels, pixel electrodes to which a voltage is supplied through the switching elements and a black matrix which blocks at least light passing through between the neighboring pixels are formed.

12. A liquid crystal display device according to claim 1, wherein, on the substrate which faces the substrate on which the color filters are formed in an opposed manner, switching elements for selecting the pixels, pixel electrodes to which a voltage is supplied through the switching elements and a black matrix which blocks at least light passing through between the neighboring pixels are formed.

13. A liquid crystal display device according to claim 1, wherein a black matrix which blocks at least light passing through between the neighboring pixels is formed on said substrate on which said color filters are formed, and switching elements which selects said pixels and pixel electrodes to which a voltage is supplied through said switching elements are formed on said substrate which faces said substrate on which said color filters are formed in an opposed manner.

14. A liquid crystal display device according to claim 1, wherein said liquid crystal display device constitutes a transmissive type display.

15. A liquid crystal display device according to claim 1, wherein said liquid crystal display device constitutes a reflective type display.

16. A liquid crystal display device according to claim 1, wherein said liquid crystal display device constitutes both of a transmissive type display and a reflective type display.

17. A liquid crystal display device according to claim 1, wherein each of the color filters has a shape which intersects said first side and said second side obliquely at portions where said color filter forming region and said color filter non-forming region are changed over.

18. A liquid crystal display device according to claim 1, wherein each of said first side and said second side has said color filter forming region and said color filter non-forming region changed over substantially at a center point such that a length of said color filter forming region is substantially equal to a length of aid color filter non-forming region.

19. A liquid crystal display device according to claim 1, wherein said first side and said second side are substantially in parallel.

20. A liquid crystal display device comprising:
a pair of substrates:
a liquid crystal layer which is sandwiched between the pair of substrates;
a plurality of pixels which are arranged in a matrix array; and
color filters, wherein
a color filter forming region and a color filter non-forming region are formed within a lighting region in each of the pixels, said lighting region is visible to a viewer in the inside of one pixel,
a first side of the lighting region includes both of the color filter forming region and the color filter non-forming region,
a second side of the lighting region which faces the first side in an opposed manner includes both of the color filter forming region and the color filter non-forming region, the color filter non-forming region of the first side faces the color filter forming region of the second side in an opposed manner, the color filter non-forming region of the second side faces the color filter forming region of the first side in an opposed manner, each of the color filters has a shape which intersects the first side and the second side obliquely at portions where the color filter forming region and the color filter non-forming region are changed over.

21. A liquid crystal display device comprising:
a pair of substrates;
a liquid crystal layer which is sandwiched between said pair of substrates;
a plurality of pixels having pixel electrodes which are arranged in a matrix array; and
color filters, wherein
at least one color filter forming region and at least one color filter non-forming region are provided in the inside of each of the pixels,
a straight first side of each of the pixel electrodes includes said color filter forming region and said color filter non-forming region,
a second side of said each pixel electrode which faces said first side in an opposed manner includes said color filter forming region and said color filter non-forming region,
said color filter forming region of said first side entirely corresponds to said color filter non-forming region of said second side, and
said color filter non-forming region of said first side entirely corresponds to said color filter forming region of said second side.

22. A liquid crystal display device comprising: a pair of substrates;
a liquid crystal layer which is sandwiched between said pair of substrates;
a plurality of pixels which are arranged in a matrix array;
color filters; and
a black matrix with a plurality of opening portions,
wherein at least one color filter forming region and at least one color filter non-forming region are provided in the inside of each of the pixels,
a first side of each of the opening portions formed in said black matrix includes said color filter forming region and said color filter non-forming region,
a second side which faces said first side of said each opening portion of said black matrix in an opposed manner includes said color filter forming region and said color filter non-forming region,
said color filter forming region of said first side entirely corresponds to said color filter non-forming region of said second side, and
said color filter non-forming region of said first side entirely corresponds to said color filter forming region of said second side.

* * * * *